United States Patent
Hirooka et al.

(10) Patent No.: US 8,792,039 B2
(45) Date of Patent: Jul. 29, 2014

(54) OBSTACLE DETECTION DISPLAY DEVICE

(75) Inventors: Shinichiro Hirooka, Fujisawa (JP); Hiroshi Chiba, Yokohama (JP)

(73) Assignee: Clarion Co., Ltd., Tokyo (JP)

( * ) Notice: Subject to any disclaimer, the term of this patent is extended or adjusted under 35 U.S.C. 154(b) by 365 days.

(21) Appl. No.: 13/140,112

(22) PCT Filed: Jan. 19, 2010

(86) PCT No.: PCT/JP2010/000263
§ 371 (c)(1),
(2), (4) Date: Jun. 16, 2011

(87) PCT Pub. No.: WO2010/084731
PCT Pub. Date: Jul. 29, 2010

(65) Prior Publication Data
US 2011/0249153 A1    Oct. 13, 2011

(30) Foreign Application Priority Data
Jan. 20, 2009    (JP) .................................. 2009-009806

(51) Int. Cl.
*H04N 5/222*    (2006.01)

(52) U.S. Cl.
USPC ...... 348/333.03; 348/143; 348/149; 348/169; 382/103; 382/291

(58) Field of Classification Search
USPC .............. 348/137, 141, 143, 149, 169, 208.1, 348/241, 333.03; 382/103, 104, 151, 275, 382/291
See application file for complete search history.

(56) References Cited

U.S. PATENT DOCUMENTS

2009/0160996 A1 * 6/2009 Yamaoka et al. ........ 348/333.11

FOREIGN PATENT DOCUMENTS

| JP | 2007-172540 | 7/2007 |
| JP | 2008-116663 | 5/2008 |
| WO | WO 2007/055336 A1 | 5/2007 |

* cited by examiner

*Primary Examiner* — Paul Berardesca
(74) *Attorney, Agent, or Firm* — Antonelli, Terry, Stout & Kraus, LLP.

(57) ABSTRACT

An obstacle detection display device, for enabling to display the information of a result of image recognition at high accuracy, at high speed and without position error of shift, even for an image photographed by a wide-angle camera, is constructed with: an image pickup means; an image correcting means for executing geometrical correction upon a video signal outputted from the image pickup means through image processing, and thereby outputting it; an image recognizing means for detecting object information by executing image processing on the video signal outputted from the image correcting means; a display information producing means for determining display information and display position in the video signal, to be presented to a user, being superimposed on the video signal, which is outputted by the image pickup means, upon basis of the object information detected by the image recognizing means, and thereby outputting them; and a display information superimposing means for superimposing the display information outputted by the display information producing means upon the video signal outputted from the image pickup means, upon basis of the display information outputted by the display information producing means. The display information producing means executes correction calculation upon the display position, by taking an error of positions on the video signal, between the video signal outputted by the image correcting means and the video signal outputted from the image pickup means, into the consideration thereof, when determining the display position of the display information to be superimposed on the video signal outputted by the image pickup means.

9 Claims, 6 Drawing Sheets

DISPLAY IMAGE

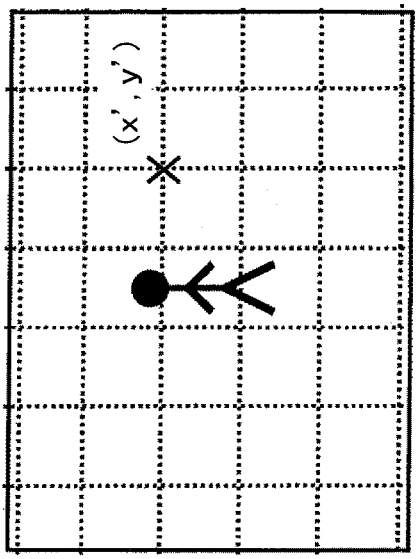
FIG. 2A IMAGE PHOTOGRAPHED
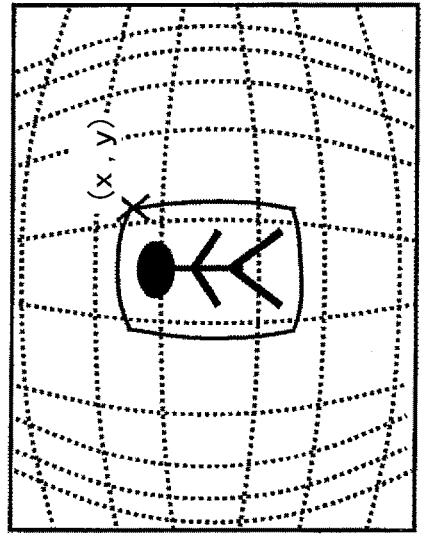
FIG. 2B IMAGE CORRECTED ON LENS DISTORTION
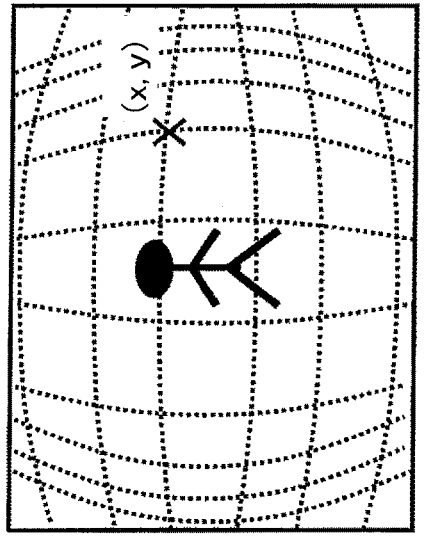
FIG. 2C EXAMPLE WHEN SUPERIMPOSING RECOGNISITON RESULT UPON IMAGE CORRECTED ON LENS DISTORTION
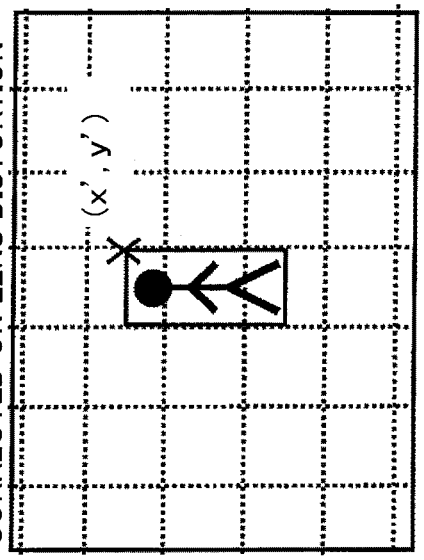
FIG. 2D DISPLAY IMAGE

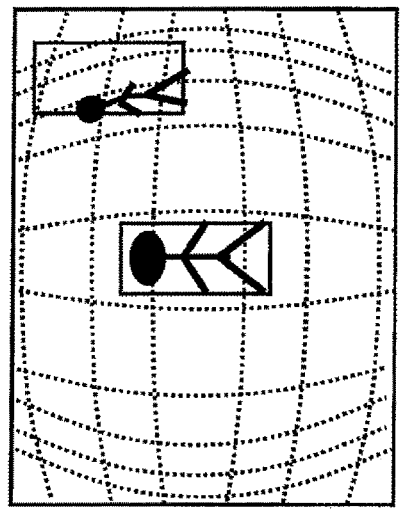
FIG. 3B  WITHOUT CORRECTION ON COORDINATES OF FRAME
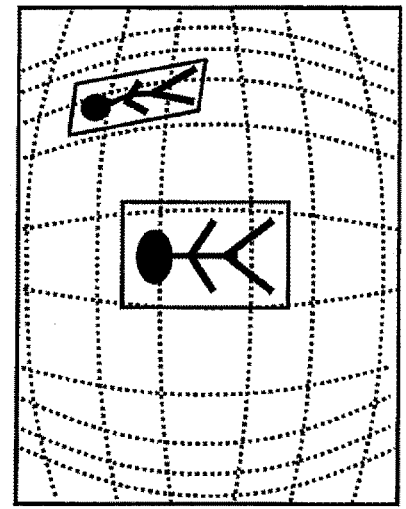
FIG. 3D  COORDINATES CORRECTION ONLY ON CORNERS OF FRAME
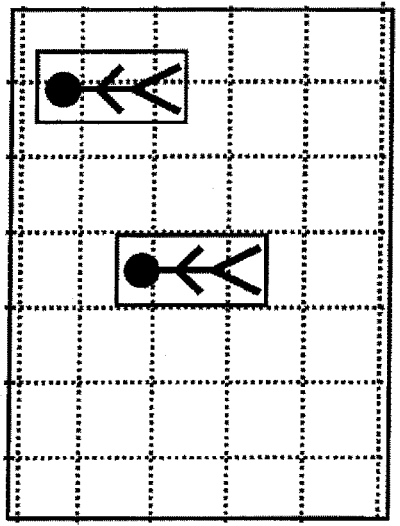
FIG. 3A  EXAMPLE WHEN SUPERIMPOSING RECOGNISITON RESULT UPON IMAGE CORRECTED ON LENS DISTORTION
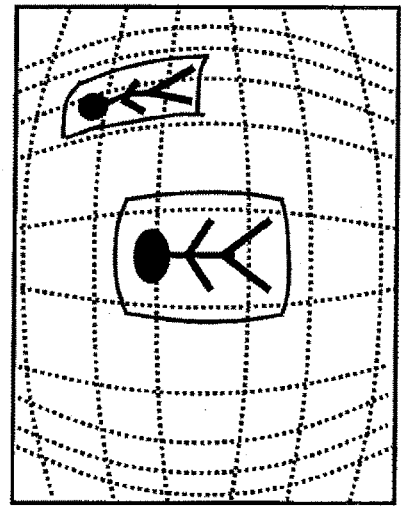
FIG. 3C  COORDINATES CORRECTION ON ENTIRE FRAME

OBSTACLE DETECTION DISPLAY DEVICE

TECHNICAL FIELD

The present invention relates to an obstacle detection display device, for detecting an obstacle, etc., through conduction of an image recognition with using an image or a picture obtained by a camera, and thereby displaying the obstacle detected by said recognition, being superimposed on the image obtained by means of display information.

BACKGROUND ART(S)

As a background art relating to the present technology is already known the following Patent Document 1, for example, and in that publication, for the purpose of "providing a mobile unit determining system and a mobile unit determination method, for enabling to determine a mobile unit approaching thereto, on a road having a low visibility, such as, a dead angle of crossroads or a curve having bad view, etc, and further a computer program for achieving said mobile unit determination method with using a computer therein," and as a means for dissolving that, there is disclosed a technology "A CPU 28 calculates an averaged value of motion vector directions of pixels within linked blocks, and identifies the averaged value calculated as a direction of movements of the linked blocks. The CPU 28 calculates a difference of angle between the identified direction of movement and a predetermined approaching direction, and if the calculated difference of the angle is equal to or less than a second threshold value, it produces a display image to be composed with a photographed image. With doing this, the display information for emphasizing that mobile unit is added, when it is determined that there is a mobile unit moving in a direction approaching thereto, as being the mobile units on the photographed image."

PRIOR ART DOCUMENT(S)

Patent Document

Patent Document 1: Japanese Patent Laying-Open No. 2007-172540

BRIEF SUMMARY OF THE INVENTION

Problem(s) to be Dissolved by the Invention

By the way, in recent years, as a rear camera to be mounted on a mobile, etc., it is widely spread, such as, that adopting a wide-angle camera, for example, a fisheye lens therein, for the purpose of reducing the dead angle thereof. With such wide-angle camera, although the image obtainable from that is largely curved, in particular, on the peripheral portions thereof, due to an effect or influence of an optical distortion of a lens; however, when trying to correct that distortion through video or image processing, since a central portion of the image is contracted or downsized, relatively, while on the other hand the distortion of a projection on the peripheral portions of the image becomes large, therefore, instead, an outlook or external appearance when seeing that image comes to be unnatural. For that reason, rather an image or a picture, the distortion of which is not corrected, or upon which the correction is made in such a degree that the distortion still remains a little bit, is preferable when watching it on a monitor.

On the other hand, an image recognition technology is put into a practical use thereof, for conducting detection and/or chasing a specific object with treating the video processing on the image, which is obtained from a camera; however, when trying to conduct the recognition of a body or a unit with using such image processing, it is required to correct the lens distortion, for the purpose of recognition at high accuracy. For example, within so-called a stereo camera, which calculates a distance up to an object upon basis of the images obtained from two (2) or more numbers of cameras, since it uses geometric positions within the images of the object, it is necessary to correct those distortions of the lenses up to such an accuracy thereof, that an approximation can be made under a condition that there is no distortion. For that reason, when trying to display a result of recognition of the positions of the object, etc., which can be obtained upon basis of the images corrected on the distortion thereof, with superimposing characters and/or graphics on the image having the distortion thereof, to a user, there is produced an error or a shift of the position due to presence/absence of the distortion. In particular, with such wide-angle lens as was mentioned above, the effect of the lens distortion is large, and therefore this position error can brings about a problem, easily.

With the Patent Document 1 mentioned above, the mobile unit is detected by conducting the calculation of the movement vectors through the video processing, upon the image photographed by the camera, and a rectangular frame surrounding the mobile unit, which is detected, is displayed, being superimposed on that image. However, since no correction is made on the lens distortion for the image, if the lens distortion is large, there is a possibility that the accuracy of detection comes down. In the same Patent Document 1, as a method other than that, there is also described that, in particular, when using an image of such camera, such as, the fisheye lens (i.e., an ultra wide-angle lens) therein, and that the image may be converted into a bird's-eye view; thereby achieving a detection at high accuracy, but without (or lessening) the ill influence of that lens distortion. However, even in this case, since it changes from the original image, largely, in a view point and/or an angle of the view thereof, there is a problem that the user cannot see the image photographed, which she/he primarily wishes to see, or that the rectangular frame cannot be superimposed properly on the image photographed.

Then, according to the present invention, being achieved by taking the problem(s) of the conventional technology mentioned above into the consideration thereof, an object thereof is to provided an obstacle detection display device for enabling an emphasized display without giving a funny or uncomfortable feeling to a user, by producing the display information of an obstacle upon basis of a result of image recognition at high accuracy, even for an image, being natural in appearance and including the lens distortion therein, which is photographed by the wide-angle camera, and also by superimposing that display information on the obstacle detected, at high speed but without position error (or shift) thereof.

Means for Dissolving the Problem(s)

For accomplishing the object mentioned above, according to the present invention, firstly there is provided an obstacle detection display device, comprising: an image pickup means having a lens; an image correcting means for executing geometrical correction upon a video signal having distortion, which is outputted by said image pickup means, and thereby outputting it therefrom; an image recognition means for detection an obstacle and object information thereof, by executing video processing on the video signal corrected on the distortion thereof, which is outputted by said image correcting means; a display information producing means for determining display information, including a frame for use of emphasizing display, to be presented to a user being superimposed on the video signal having the distortion, which is outputted by said image pickup means, and position for displaying said display information in the video signal having the distortion therein, upon basis of the object information detected by said image recognition means, and thereby outputting them therefrom; and a display information superimposing means for superimposing the display information, which is outputted by said display information producing means, on the video signal having the distortion, which is outputted by said image pickup means, upon basis of the display position outputted by said display information producing means, and thereby outputting them therefrom, wherein said display information producing means executes correction calculation upon said display information including the frame for the emphasizing display, by taking a position error of said obstacle, between the video signal corrected on the distortion thereof, which is outputted by said image correcting means, and the video signal having the distortion, which is outputted by said image pickup means, into consideration, when determining the display position of the display information including the frame for use of the emphasizing display, to be superimposed on the video signal having the distortion, which is outputted by said image pickup means.

Also, according to the present invention, in the obstacle detection display device as described in the above, said image pickup means having the lens may be provided in plural numbers thereof, or wherein said image correcting means may comprise a display image correcting means for executing the geometrical correction on the video signal having the distortion, which is outputted by said image pickup means, thereby outputting it as an image for use of display therefrom, and a recognition image correcting means for executing the geometrical correction on the video signal having the distortion, which is outputted by said image pickup means, with a degree higher than that executed by said display image correcting means, thereby outputting an image for use of recognition therefrom, wherein said image recognition means executes the video processing on the image for use of recognition from said recognition image correcting means, so as to detect the obstacle and the object information thereof, and said display information superimposing means outputs the display information including the frame for the emphasizing display, which is outputted by said display information producing means, superimposing it upon the image for use of display from said display image correcting means.

Further, according to the present invention, in the obstacle detection display device as described in the above, correction information to be used when executing the geometrical correction upon the video signal having the distortion, which is outputted by said image pickup means, within said image correcting means may be same to correction information to be used when executing the correction calculation upon the display position of said display information within said display information producing means, or the correction information to be used when executing the geometrical correction upon the video signal having the distortion through video processing, which is outputted by said image pickup means, within said image correcting means, may be different from correction information to be used when executing the correction calculation upon the display position of said display information within said display information producing means are same correction information.

In addition thereto, according to the present invention, in the obstacle detection display device as described in the above, it is preferable that the correction calculation is executed upon the display positions of all pixels to be superimposed, upon basis of said correction information, when said display information producing means executes the correction calculation upon the display positions of the display information including the frame for the emphasizing display, and further that the correction calculation is executed upon the display positions of representative pixels among the pixels to be superimposed, upon basis of said correction information, while determining the display positions for other pixels through an interpolation, when said display information producing means executes the correction calculation upon the display positions of the display information including the frame for the emphasizing display.

And, according to the present invention, also for accomplishing the object mentioned above, there is provided an obstacle detection display device, comprising: a first image pickup means having a lens; a second image pickup means having a lens; an image correcting means for executing geometrical correction upon a video signal having distortion, which is outputted by said first image pickup means, and a video signal having distortion, which is outputted by said second image pickup means, respectively, and thereby outputting them as a stereo video signal therefrom; a stereo image recognition means for detection an obstacle and 3-dimentional object information thereof, by executing video processing upon the stereo video signal corrected on the distortion thereof, which is outputted by said image correcting means; a display information producing means for determining display information, including a frame for use of emphasizing display, to be presented to a user being superimposed on the video signal having the distortion, which is outputted by said first image pickup means, or on the video signal having the distortion, which is outputted by said second image pickup means, and a display position of said display information in the video signal having the distortion therein, upon basis of the 3-dimensional object information detected by said image recognition means, and thereby outputting them therefrom; and a display information superimposing means for superimposing the display information, which is outputted by said display information producing means, on the video signal having the distortion, which is outputted by said first image pickup means, or on the video signal having the distortion, which is outputted by said second image pickup means, upon basis of the display position outputted by said display information producing means, and thereby outputting them therefrom, wherein said display information producing means executes correction calculation upon said display information including the frame for the emphasizing display, by considering a position error of said obstacle, between the video signal corrected on the distortion thereof, which is outputted by said image correcting means, and the video signal having the distortion, which is outputted by said first image pickup means or outputted by said second image correcting means, when determining the display position of the display information including the frame for use of the emphasizing display, to be superimposed on the video signal having the distortion, which is outputted by said first image pickup means or by said second image pickup means.

In addition to the above, according to the present invention, also for accomplishing the object mentioned above, there is provided an obstacle detection display device, comprising: an image pickup means having a lens; a display image correcting means for executing geometrical correction upon the video signal, which is outputted by said image pickup means, and thereby outputting an image for use of display therefrom; a recognition image correcting means for executing the geometrical correction on the video signal having the distortion, which is outputted by said image pickup means, with a degree higher than that executed by said display image correcting means, thereby outputting an image for use of recognition therefrom; an image recognition means for detecting an obstacle and object information thereof, by executing image processing upon the video signal corrected on the distortion thereof, which is outputted by said recognition image correcting means; a display information producing means for determining display information, including a frame for use of emphasizing display, to be presented to a user being superimposed on the video signal having the distortion, which is outputted by said image pickup means, and position for displaying said display information in the video signal having the distortion therein, upon basis of the object information detected by said image recognition means, and thereby outputting them therefrom; and a display information superimposing means for superimposing the display information including the frame for use of the emphasizing display, which is outputted by said display information producing means, on the video signal having the distortion, which is outputted by said image pickup means, upon basis of the display position outputted by said display information producing means, and thereby outputting them therefrom, wherein said display information producing means executes correction calculation upon the display position of said display information, by taking a position error of said obstacle, between the video signal corrected on the distortion thereof, which is outputted by said recognition image correcting means, and the video signal corrected on the distortion thereof, which is outputted by said display image pickup means, into consideration, when determining the display position of the display information, including the frame for use of the emphasizing display, to be superimposed on the video signal corrected on the distortion thereof, which is outputted by said display image correcting means.

Effect(s) of the Invention

With the obstacle detection display device, according to the present invention mentioned above, it is possible to display an image, including the lens distortion therein and being unnatural on an external appearance thereof, which is photographed by a wide-angle camera, with superimposing the recognition information thereon, being obtainable upon basis of a result of recognition at high accuracy, which can be obtained by executing correction on the lens distortion thereof, at high speed and without position error or shift thereof, and with this, there can be obtained a superior effect that the user is able to confirm that recognition result without having a funny or uncomfortable feeling thereon.

BRIEF DESCRIPTION OF THE DRAWINGS

FIGS. 2A to 2D are views for showing an example of a process for calculating the display position of display information within the obstacle detection display device mentioned above;
FIGS. 3A to 3D are views also for showing an example of a process for calculating the display position of display information within the obstacle detection display device mentioned above.

DETAILED DESCRIPTION OF THE PREFERRED EMBODIMENTS

Figure 1:
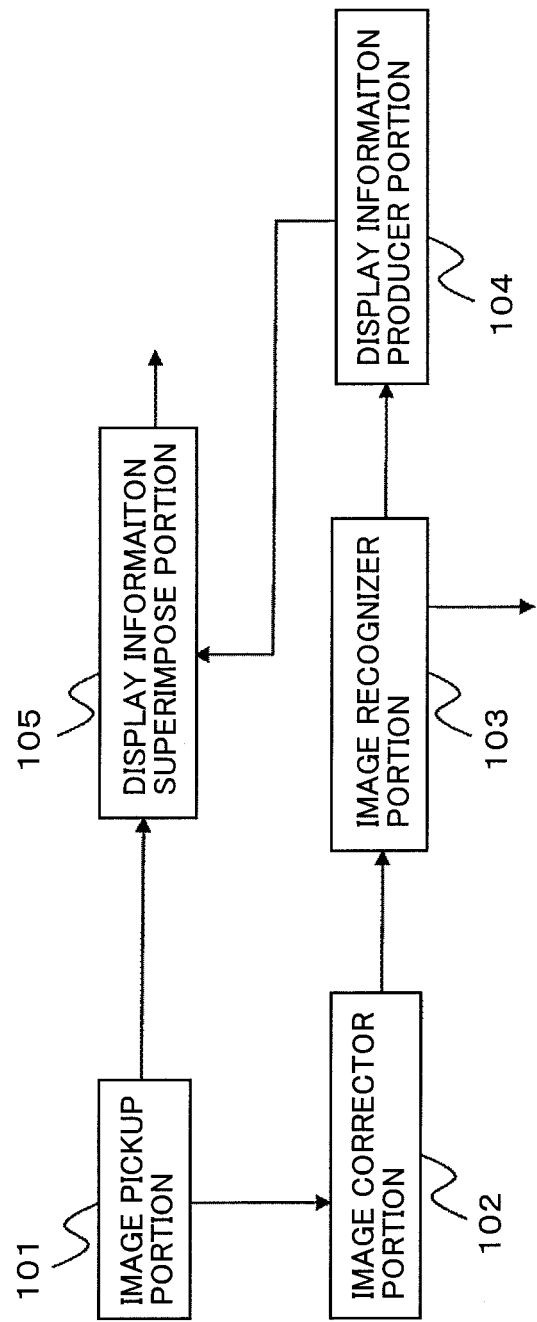
FIG. 1 is a block diagram for showing an outlook structure of an obstacle detection display device, according to a first embodiment of the present invention.

Hereinafter, explanation will be given on embodiments according to the present invention, fully, by referring to the drawings attached herewith.

Embodiment 1

First of all, FIG. 1 attached herewith is a view for showing the entire structures of an obstacle detection display device, according to a first embodiment of the present invention, wherein a reference numeral 101 in the figure depicts an image pickup portion, 102 an image corrector portion, 103 an image recognizer portion, 104 a display information producer portion, and 105 a display information superimpose portion, respectively.

In the obstacle detection display device having such construction as was mentioned above, the image pickup portion 101 is constructed with, for example, a lens, an iris, a shutter, an image pickup element, such as, a CCD, or a CMOS, etc., a CDS or an AGC, an AD converter, a camera signal processing DSP, and a timing generator, etc., and it converts an optical image (i.e., a picture), the light of which is received by that image pickup element, into an electric signal, to be outputted as a video signal. Herein, as the lens mentioned above may be used so-called a wide-angle lens, such as, the fisheye lens, etc., for example.

The image corrector portion 102 obtains the video signal, which is outputted by the image pickup portion 101, as an image or a picture (hereinafter, an "image"), and executes so-called a geometrical correction, such as, a correction of lens distortion, a correction of the angle of view, a correction of an inclination of the image, etc., for example, by conducting a video processing upon basis of image correction information, which is stored in a memory. However, this geometrical correction may be achieved with using an existing camera calibration method, such as, a method, which is used by Zhengyou Zhang, for example, representatively. Also, in this instance, as the image correction information may be used a coefficient of a function, which can be obtained by modeling a geometry of the optical system of the camera, or from a look-up table describing the correspondences between the coordinates of images before and after conducting the geometrical correction thereon. This image correction information may be calculated with using a calibration pattern, etc., in advance, to be stored in the memory, or may be calculated upon basis of the image obtained during the operation of the device, so as to renew the data in the memory, appropriately.

The image recognizer portion 103 obtains the image after the geometrical correction, which is outputted by the image corrector portion 102 mentioned above, to execute the recognition process thereon with using video or image processing, and thereby detecting object information including an obstacle therein. Herein, the object information indicates information, which can be obtained from a variety of existing image recognition technologies, i.e., a property of the object, such as, a person, a car, or a traffic lane, etc., or a configuration or a position of the object, or a condition of that object, such as, in condition of movement or standstill, etc, or a result of determination, such as, a degree of danger or a degree of crowdedness, etc., which can be presumed by combining those; and that image recognizer portion 103 can obtain the necessary information by conducting an appropriate video or image processing depending on an application thereof. And, those information (the display information), within the present obstacle detection display device, are used to be displayed, being superimposed on the image, for the purpose of presenting them to a user. Or, for example, a camera, which is mounted on the car for detecting an obstacle during a traveling thereof, may outputs that obstacle information to a vehicle speed controller portion, which is not illustrated herein, in case where there is an obstacle, for decelerating the car, or it may be further used, for other purposes than that.

The display information producer portion 104 determines the display information to be presented to the user, being super imposed on the image, and also a display position thereof on that image, upon basis of a result of recognition, which is outputted by the image recognizer portion 103 mentioned above. As this display information may be determined, in advance, for example, textual information indicating the property of the object, such as, "a person" or "a car", etc., or a frame surrounding a specific object, such as, a mobile unit, etc., for displaying it with an emphasis thereof, depending on the application thereof. However, in this instance, when displaying that display information at a position where the user can easily look at, on the video, there is a necessity to take an error or a shift of the position of the object into the consideration, between the image, upon which the geometrical correction is made, to be used in the image recognition, and the image, upon which the geometrical correction is not made, to be used for an actual display. For that reason, this display information producer portion 104 determines the display position by taking the error or shift of display of this object into the consideration thereof. However, a method for determining this display position (i.e., a display position calculating process) will be mentioned in the details thereof, afterwards, by referring to the drawings.

The display information superimpose portion 105 superimposes the display information, which is outputted by the display information producer portion 104 mentioned above, on the video signal outputted the image pickup portion 101, upon basis of the display position, which is outputted by the display information producer portion 104, and thereby producing the display image. The display image produced is outputted to a monitor portion, etc., which is not shown in the figure herein, and thereby both the image and the recognition result are presented in combination thereof. With this, it is possible to display a result of image recognition, which is detected at high accuracy with using the image, being corrected on the lens distortion thereof, while being superimposed on the image having the les distortion therein and being natural in the external appearance thereof, without the position error or shift, and therefore, for the user, it is possible to confirm the recognition result, on the image displayed, but without having a funny or uncomfortable feeling.

However, the image correction process within the image corrector portion 102, the image recognition process within the image recognizer portion 103, the display information producing process within the display information producer portion 104, and the display information superimposing process within the display information superimpose portion 105 may be executed, by means of a micro-computer in the camera or a camera signal processing DSP or a LSI for exclusive use thereof, or a micro-computer or an LSI for exclusive use thereof, etc., which is mounted on external equipment, such as, an ECU or a PC, etc., for example.

Following the above, FIGS. 2A to 2D are views for showing an operation of the obstacle detection display device, according to the embodiment 1 of the present invention, the structures of which are explained in the above, in particular, an example of a display position calculating process for the display information, which is executed within the display information producer portion 104. Herein, explanation will be given by using an application, as an example, for detecting a parson, being the object appearing in the image, which is photographed by the image pickup portion (i.e., the camera) 101, through the image recognition, so as to surround that object by the frame, and thereby obtaining the emphasizing display thereof.

First of all, FIG. 2A shows the image, which is photographed by the image pickup portion 101, FIG. 2B shows an image after correction of the lens distortion on the image, which is photographed by the image pickup portion 101, by means of the image corrector portion 102, FIG. 2C shows an image superimposing the frame thereon, surrounding the person, i.e., the object detected from the image corrected on the lens distortion thereof, as a result of recognition thereof, on the image corrected on the lens distortion thereof by the image recognizer portion 103, and FIG. 2D shows a display image superimposing the frame thereon, surrounding the object, the person detected from the image corrected on the lens distortion thereof by the image recognizer portion 103, on the image, which is photographed by the image pickup portion 101, respectively. Also, in those four (4) pieces of imagers shown in FIGS. 2A to 2D, dotted lines are additional lines, which are drawn for the purpose of presenting a degree of the lens distortion, and a mark "x" and a character line on the right-upper part thereof are additional information, which are described for clearly showing the representative coordinates on the image; however, those do not show the object on the actual image.

The process for correcting the lens distortion, which is executed by the image corrector portion 102, shown in FIGS. 2A and 2B, can be carried out by copying pixel data of the coordinates (x,y) in the image, which is photographed by the image pickup portion 101, to the pixels of the coordinates (x',Y') corresponding thereto in the image, the lens distortion of which is corrected (see FIG. 2B). The corresponding relationship of those can be obtained, easily, as was mentioned above; for example, by using coefficients of a function equation for modeling the lens distortion, which is stored in advance into the memory within the image corrector portion 102, or stored on a look-up table describing such correspondence thereon. Also, high accuracy of the correction may be achieved, by executing an interpolation from the peripheral pixels having an accuracy of integer, when copying the pixel data, while keeping the coordinates (x,y) in the image photographed at the accuracy lower than a decimal point; thereby, obtaining the pixel data.

Also, in FIG. 2C is shown an image when detecting the person, being the object, detected from the image, the lens distortion thereof is corrected by the image recognizer portion 103 with using the image recognition process therein, so as to produce the frame surrounding that object (i.e., the display information), in the form of rectangular solid lines, as well as, to determine a display color and display pixels (i.e., the display position) thereof; thereby that frame (i.e., the display information) is superimposed thereon to be displayed. Further, in FIG. 2D is shown a display image, which is produced by superimposing the frame thereon, in the similar manner to that mentioned above, on each pixel of the image, which is photographed by the image pickup portion 101, corresponding to the pixels displaying the frame surrounding the object, i.e., the person shown in FIG. 2C mentioned above. Thus, in the display image shown in FIG. 2D, also the frame, being superimposed thereon to be displayed, comes to be distorted, similar to the image, which is photographed by the image pickup portion 101.

However, in those display images, the pixels, on which the frame is superimposed to be displayed, differing from the process for correcting the lens distortion shown in FIGS. 2A and 2B, can be determined, by obtaining the coordinates (x,y) on the image, which is photographed by the image pickup portion 101, corresponding to the coordinates (x,y') on the image corrected on the lens distortion thereof (see FIG. 2B). Therefore, after determining the positions of pixels, at which the object information should be displayed, on the image corrected on the lens distortion thereof, it is enough, for the image recognizer portion 103, to convert it into positions of the pixels, on which the display information should be superimposed, upon the coordinates on the image photographed by the image pickup portion 101, upon basis of the corresponding relationships therebetween, and thereby to output that information to the display information producer portion 104, as the display position information. However, in this instance, since it is enough to execute the process for converting that coordinates, only on the pixels, on which the object information should be displayed, comparing to the case where the correction of the lens distortion must be made on the image as a whole, therefore it is possible to correct the position error or shift due to presence/absence of the distortion, at the display position of the object information. Further, the image shown in FIG. 2C mentioned above is not the image, which is actually produced in the present obstacle detection display device, but it is that, which is produced, virtually, for the purpose of the explanation, and therefore, it is not necessary to produce this image, always or necessarily.

Herein, by using (sharing in common) the image conversion information, which is stored in the image corrector portion 102 for correcting the lens distortion, so as to obtain the coordinates (x,y) in the image photographed by the image pickup portion 101, corresponding to the coordinates (x',y') in the image corrected on the lens distortion thereof, it is possible to share the memory in common, and thereby reducing the memory capacity thereof. Or, alternately, it may be stored into the look-up table, in advance, for example, for correcting the display position of the object information, as separate image conversion information different from that image conversion information. This is effective, for example, when superimposing the display information, in particular, where the image of the display information to be superimposed and the original image are held in the form of the video data of different dissolutions, etc.

Also, FIGS. 3A to 3D are views for showing other example of the process for calculating the display portion of the display information mentioned above; herein, explanation will be given with using an application, as an example, wherein the objects, being two (2) persons appearing on the image photographed by the camera through the image recognition, and those persons are surrounded by the frames (i.e., the display information) to be displayed with emphasis thereof.

First of all, FIG. 3A shows an example of the image superimposing the frames surrounding the persons, being the objects detected from the image, as a result of the recognition, on the image, the lens distortion of which is corrected by the image recognizer portion 103, and FIG. 3B shows an example of the display image superimposing the frames surrounding the objects, being the persons detected from the image, the lens distortion of which is corrected by the image recognizer portion 103, on the image photographed by the image pickup portion 101, as they are, but without executing the process for calculating the display portion, which was explained by referring to FIGS. 2A to 2D mentioned above, respectively. Also, FIG. 3C shows an example of the display image superimposing the frames surrounding the objects, being the persons detected from the image, the lens distortion of which is corrected by the image recognizer portion 103, on the image photographed by the image pickup portion 101, as they are, after making the correction of the display positions upon basis of the process for calculating the display position, which was explained by referring to FIGS. 2A to 2D mentioned above, over all of the display pixels thereof, and further, FIG. 3D shows an example of the display image of superimposing the frames surrounding the objects, being the persons detected from the image, the lens distortion of which is corrected by the image recognizer portion 103, on the image photographed by the image pickup portion 101, as they are, after making the correction of the display positions thereof, upon basis of the process for calculating the display position, which was explained by referring to FIGS. 2A to 2D mentioned above, only on the pixels on the corners of that frames, as well as, executing an interpolation of the display position for other pixels. However, also in four images shown in those figures, dotted lines are additional lines, which are drawn for presenting a degree of the lens distortion, but not showing the objects in the actual image.

However, in the image shown in FIG. 3B, among the four (4) images mentioned above, since the frames surrounding the objects, being the persons, are superimposed, as they are, without making correction on the display position thereof, it can be seen that the position error or shift is generated between them, in particular, the objects, being the persons appearing on the peripheral portions of the image, due to an influence of the distortion. For this reason, there may occurs a problem for the user, i.e., she/he cannot find out the object, being the person, immediately, when looking at the image, or she/he misunderstands other object to be the object to be detected in case where the other object appears in part within that frame, etc.

On the other hand, in the images shown in FIGS. 3C and 3D, the frame surrounding the object, being the person, is superimposed after being corrected on the display position thereof, it can be seen that, the object, being the person appealing on the peripheral portion of the image, is displayed, correctly, with emphasis thereof by the frame surrounding on the peripheries thereof.

In particular, in FIG. 3C, a process for superimposing the surrounding frame, after making the correction of the display positions upon all of the pixels building up the surrounding frame to be superimposed on the display image, with the process for calculating the display portion, which was explained by referring to FIGS. 2A to 2D mentioned above. For that reason, each side of the surrounding frame, which is inherently constructed with straight lines, is displayed in the form of being distorted along the lens distortion. For that reason, when displaying such frame surrounding the object, being the person, although there may be a possibility of seeing unnatural, instead; however, it is preferable that those display information are also distorted along the lens distortion, for example, when displaying the direction of movement of the car as a guideline, for executing an assistance of stopping the car, or when detecting a white line so as to display it with emphasis thereof, for example, and for that reason, rather the present display method is effective much more.

On the other hand, in FIG. 3D, the correction of the display position is made only on the pixels on the corners of the surrounding frame to be superimposed on the display image, with the process for calculating the display position, which was explained by referring to FIGS. 2A to 2D, while other than that, i.e., each of the pixels for building up the sides of the surrounding frame is calculated by making the interpolation from the positions on the corners after the correction, to be superimposed. For that reason, even on the display image, each side of that surrounding frame keeps the linearity (i.e., being a straight line), and therefore it can be seen to be natural much more. However, in this instance, the positions of the pixels on the corners of the surrounding frame after the conversion may be corrected, further, so that the four (4) points thereof defines an oblong, and thereby the surrounding frame defines the oblong even in the display image. In this manner, by exchanging the method for correcting the display position of the display information, depending on the application, it is possible to provide that object information, in such a method or manner that it can be seen to be natural for the user, being suitable for the way of use thereof.

As was mentioned above, within the obstacle detection display device, for executing the image recognition with using the image obtained by the camera and thereby displaying the result of recognition with superimposing it on the image, it is possible to superimpose the information of the result of image recognition with high accuracy, which can be obtained with using the image corrected on the lens distortion thereof, at high-speed and without the position error or shift, for the image not corrected on the lens distortion thereof, which is photographed by the wide-angle camera.

Embodiment 2

Figure 4:
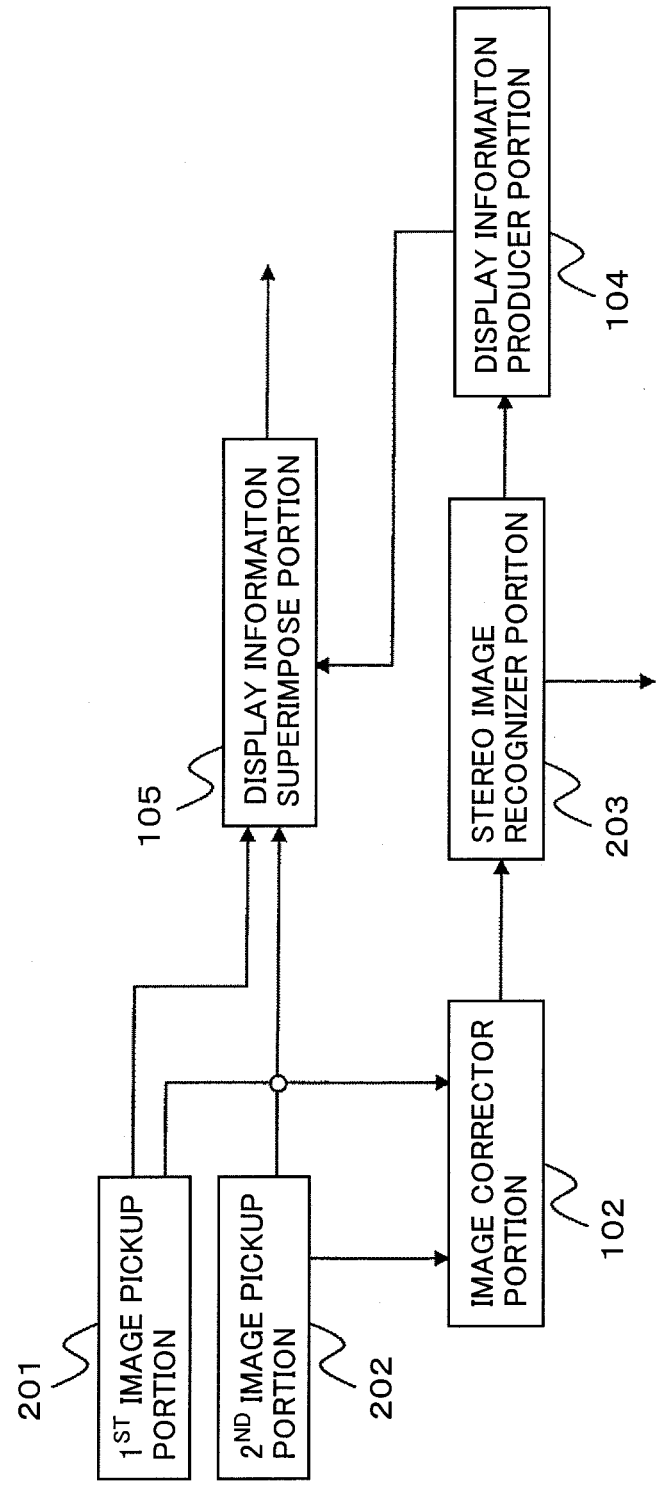
FIG. 4 is a block diagram for showing an outlook structure of an obstacle detection display device, according to a second embodiment of the present invention.

Following to the above, FIG. 4 attached herewith is a view for showing the entire structure of the obstacle detection display device, according to a second embodiment of the present invention. However, in this FIG. 4, a reference numeral 201 depicts a first image pickup portion, 201 a second image pickup portion, and 203 a stereo image recognizer portion, respectively, while other reference numerals, being same to those mentioned above, depict the same structures of the constituent elements in the embodiment 1 mentioned above, and therefore, the explanations thereof will be omitted herein. Thus, the obstacle detection display device, according to this second embodiment has such structure, comparing to the first embodiment shown in FIG. 1 mentioned above, that the image pickup portion is substituted with two (2) sets of image pickup portions 201 and 202, and that the image recognizer portion is substituted with the stereo image recognizer portion 203, respectively.

In the obstacle detection display device shown in this FIG. 4, the first image pickup portion 201 and the second image pickup portion 202 are constructed with a lens, an iris, a shutter, an image pickup element, such as, a CCD, or a CMOS, etc., a CDS or an AGC, an AD converter, a camera signal processing SDP, and a timing generator, etc., respectively, similar to that mentioned above, and it converts an optical image, the light of which is received by that image pickup elements, into an electric signal, to be outputted as an video signal. Herein, also as the lens mentioned above may be used so-called the wide-angle lens, such as, the fisheye lens, etc., for example. And, in this instance, it is preferable that the video signal outputted by the first image pickup part 201 and the video signal outputted by the second image pickup portion 202 are, though not shown in the figure, are in synchronism with each other when exposing, with using a synchronizing circuit, etc., for example.

However, in the obstacle detection display device, the structure of which was mentioned in the above, the image corrector portion 102 obtains the video signal, which is outputted by the first image pickup portion 201, and the video signal, which is outputted by the second image pickup portion 202, respectively, as the image, so as to execute an geometrical correction, such as, the correction of lens distortion, the correction of an angle of field, or the correction of an inclination of image, etc., for example, with using the image processing, upon basis of the video correction information stored in the memory, and in addition thereto, further for the purpose of executing the stereo video processing at high accuracy, the geometrical correction of an error or shift of the angle of field between the cameras and/or an error or shift of the optical axes, and thereby outputting two (2) pieces of images after correction, in a pair, as the stereo images.

The stereo image recognizer portion 203, obtaining the stereo images after the geometrical correction, which is outputted by the image corrector portion 102, executes a preprocess for conducting a low-pass filtering process to remove noises therefrom, or a process for calculating a characteristic amount, such as, an edge detection, etc., or a stereo matching process for obtaining parallax information by searching out corresponding points between the stereo images, with using various kinds of processes for calculating the correlation thereof, for example, a block matching of normalized cross-correlations or a sum of absolute differences, etc., or a space-seep method, etc., further a post-process for removing a singularity through a rank filtering process or a labeling, etc., and also a distance calculation process for calculating the distance information with using the parallax information, etc.; thereby outputting 3D information, including the parallax information, the distance information, 3D position information, and/or an estimation value indicating a reliability of 3D measurement, and/or the target information, which is detected upon basis of the 3D information, as a result of 3D recognition. However, in this instance, further, if combining it with the result of recognition of the video process of a single eye, it is possible to execute the recognition process of much higher dimension, such as, determining on whether a front-running car comes close or not, to the car itself, for example.

The display information producer portion 104 determines the display information to be presented to the user, being superimposed on the image, and the display position thereof on that image, upon basis of the information of the recognition result, which is outputted by the stereo image recognizer portion 203. The display information superimpose portion 105 superimposes the display information, which is outputted by the display information producer portion 104 mentioned above, on the video signals, which are outputted by the first image pickup portion 201 and the second image pickup portion 202, also upon basis of that display information, which is outputted by the display information producer portion 104 mentioned above, and thereby producing the display image. Further, it is possible to present this display image produced to the user, combining the image with the recognition result, by outputting it on a monitor, which is not shown in the figure herein. However, in this instance, as the image to be used for display, for example, the image of the image pickup portion having high priority may be selected, if there are differences in sensitivity, picture quality and/or the angle of field between those two (2) image pickup portions mentioned above, or other than that, the image pickup portion may be selected, the setting portion of which is near to that of a viewpoint of the user; i.e., it is preferable to use the image fitting to the way of use by the user. Also, the images from those image pickup portions may be composed to produce the image.

With this, also even when applying the stereo camera therein, for the user, it is possible to display the result of image recognition detected at high accuracy with using the images, the lens distortions of which are corrected, being superimposed without an error or shift of positions, even on the images including the lens distortions therein and being seen to be natural, which are photographed by the two (2) sets of cameras, and thereby confirming the result of recognition without the funny or uncomfortable feeling. Further, the image recognition process in the stereo image recognizer portion 203 may be executed by the microcomputer in each of the cameras or the camera signal processing DSP or the LSI for exclusive use thereof, or by the microcomputer or the LSI, which is mounted on external equipment, such as, ECU or PC, etc. However, herein although the explanation was given on the case of using the stereo camera including two (2) sets of the image pickup portions therein, but the present invention should not be limited to this, it is also possible to achieve the similar effect with the similar structure to that mentioned above, for example, by means of a multi-camera having three (3) or more numbers of image pickup portions, a pseudo stereo camera for producing pseudo-pictures of two (2) or more numbers of viewpoints by combining one (1) set of image pickup portion and a mirror, etc., or a motion stereo for producing the images of two (2) or more numbers of viewpoints through photographing by the single-eye camera with moving thereof.

In addition thereto, even within the obstacle detection display device, according to the embodiment 2 of the present invention, the process for calculating the display position of the display information, which is executed in the display information producer portion 104 mentioned above, is similar to that shown in FIGS. 2A to 2D and FIGS. 3A to 3D, and therefore the explanation thereof will be omitted, herein.

Embodiment 3

Figure 5:
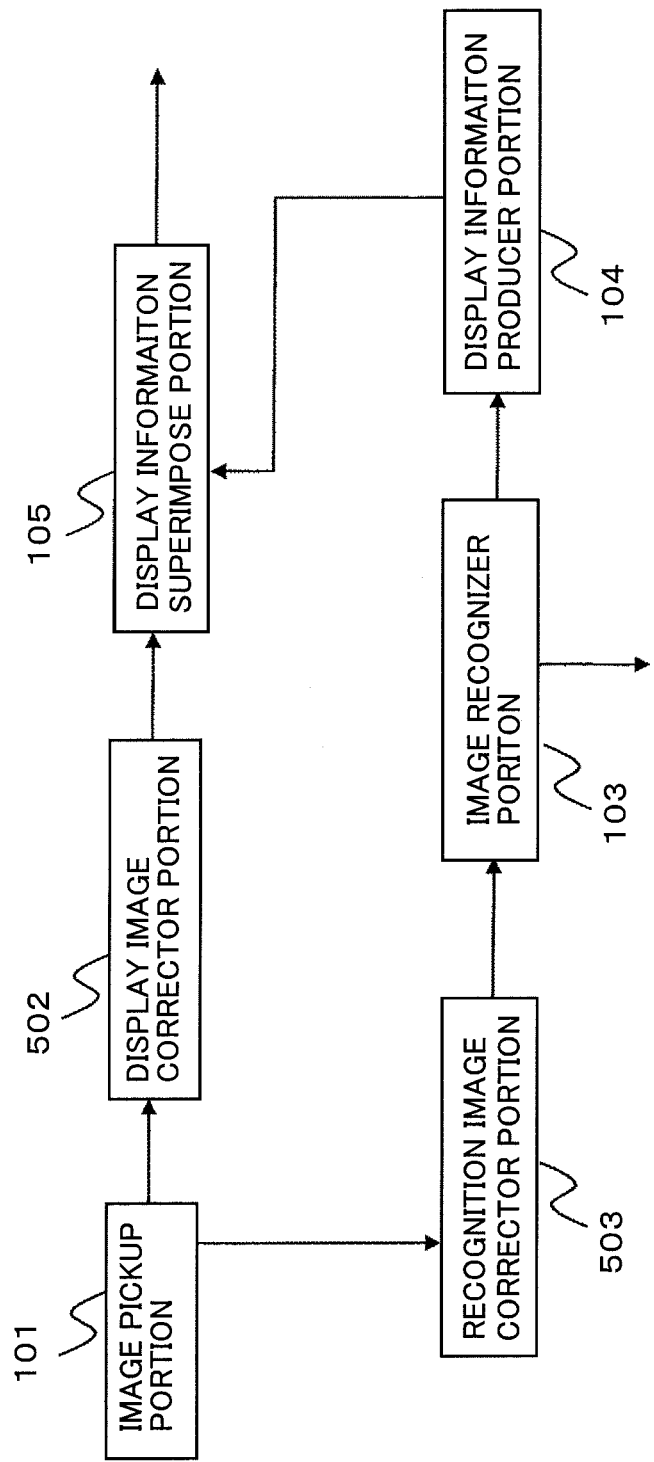
FIG. 5 is a block diagram for showing an outlook structure of an obstacle detection display device, according to a third embodiment of the present invention.

Following to the above, FIG. 5 attached herewith is a view for showing an outline structure of the obstacle detection display device, according to a third embodiment (the embodiment 3) of the present invention, wherein a reference numeral 502 depicts a display image corrector portion, and 503 a recognition image corrector portion, respectively, while the reference numerals same to those mentioned above show the same structures of the constituent elements of the embodiment 1 mentioned above, and therefore the explanation thereof will be omitted herein.

However, in the obstacle detection display device shown in this FIG. 5, each of the display image corrector portion 502 and the recognition image corrector portion 503 obtain the video signal outputted from the image pickup portion 101, respectively, so as to executes the video processing upon basis of the image correction information, which is stored in the memory, thereby conducting geometrical corrections, such as, the correction of the lens distortion and/or the correction of inclination of the image, etc. However, this geometrical correction may be achieved with using the existing camera calibration method, such as, a method, which is used by Zhengyou Zhang, for example, representatively. Also, in this instance, in the similar manner to that mentioned above, as the image correction information may be used the coefficient of the function, which can be obtained by modeling a geometry of the optical system of the camera, or the look-up table describing the correspondences of coordinates of the images before and after conducting the geometrical correction. This image correction information may be calculated by using a calibration pattern, etc., in advance, to be stored in the memory, or may be calculated upon basis of the image obtained during the operation of the device, and thereby to renew the data in the memory, appropriately.

Herein, the display image corrector portion 502, not using the video signal outputted by the image pickup portion 101 as it is, differing from the embodiment 1 mentioned above, but executes the correction of the lend distortion, etc., in such a manner that the distortion remains therein with a certain degree thereof, for the purpose of producing the video, which is natural in the external appearance. On the other hand, the recognition image corrector portion 503 executes the correction of the lens distortion, etc., to be executed with the image recognition, fully at high accuracy, within the image corrector portion 102. The degree of the image correction process executed by this display image corrector portion 502 may be determined, for example, in an adjustment step, etc., before shipping of that product, upon basis of a trend of taste of the user, etc., for example. On the contrary to this, the degree of the image correction process, which is executed by the image recognizer portion 103, is determined or set from an accuracy required for the image recognition. Further, this image recognizer portion 103 obtains the image after the geometrical correction, which is outputted by the recognition image corrector portion 503, so as to execute the recognition process through the video processing, and thereby it detects the object information. Thus, the degree of correction of the lens distortion, which is executed by the display image corrector portion 502, is determined or set to be lower than the degree of correction of the lens distortion, which is executed by the recognition image corrector portion 503.

Also, the display information producer portion 104 determines the display information to be presented to the user, being superimposed on the image, and the display position thereof on that image, upon basis of the information of the recognition result, which is outputted by the image recognizer portion 103. And, the display information superimpose portion 105 superimposes the display information outputted by the display information producer portion 104 on the video signal, which is outputted by the display image corrector portion 502 mentioned above, upon basis of that display position. However, it is same as was mentioned above that the display image produced is presented to the user, combining the image and the recognition result, by outputting it to the monitor portion, etc., which is not shown in the figure. With this, the image recognition result detected by using the image, the lens distortion of which is corrected at high accuracy, can be superimposed to be displayed on the image, the lens distortion of which is corrected in such the degree that it can be seen in natural, without the position error or shift thereof, and therefore for the user, it is possible to confirm the result of recognition without the funny or uncomfortable feeling. Further, also the video correction processes within the display image corrector portion 502 and the recognition image corrector portion 503 may be executed, as was mentioned above, for example, by the microcomputer in each of the cameras or the camera signal processing DSP or the LSI for exclusive use thereof, or by the microcomputer or the LSI, which is mounted on external equipment, such as, ECU or PC, etc., similar to the image recognition process in the image recognizer portion 103, the display information producing process in the display information producer portion 104 and the display information superimposing process in the display information superimpose portion 105, as was mentioned in the above.

Figure 6:
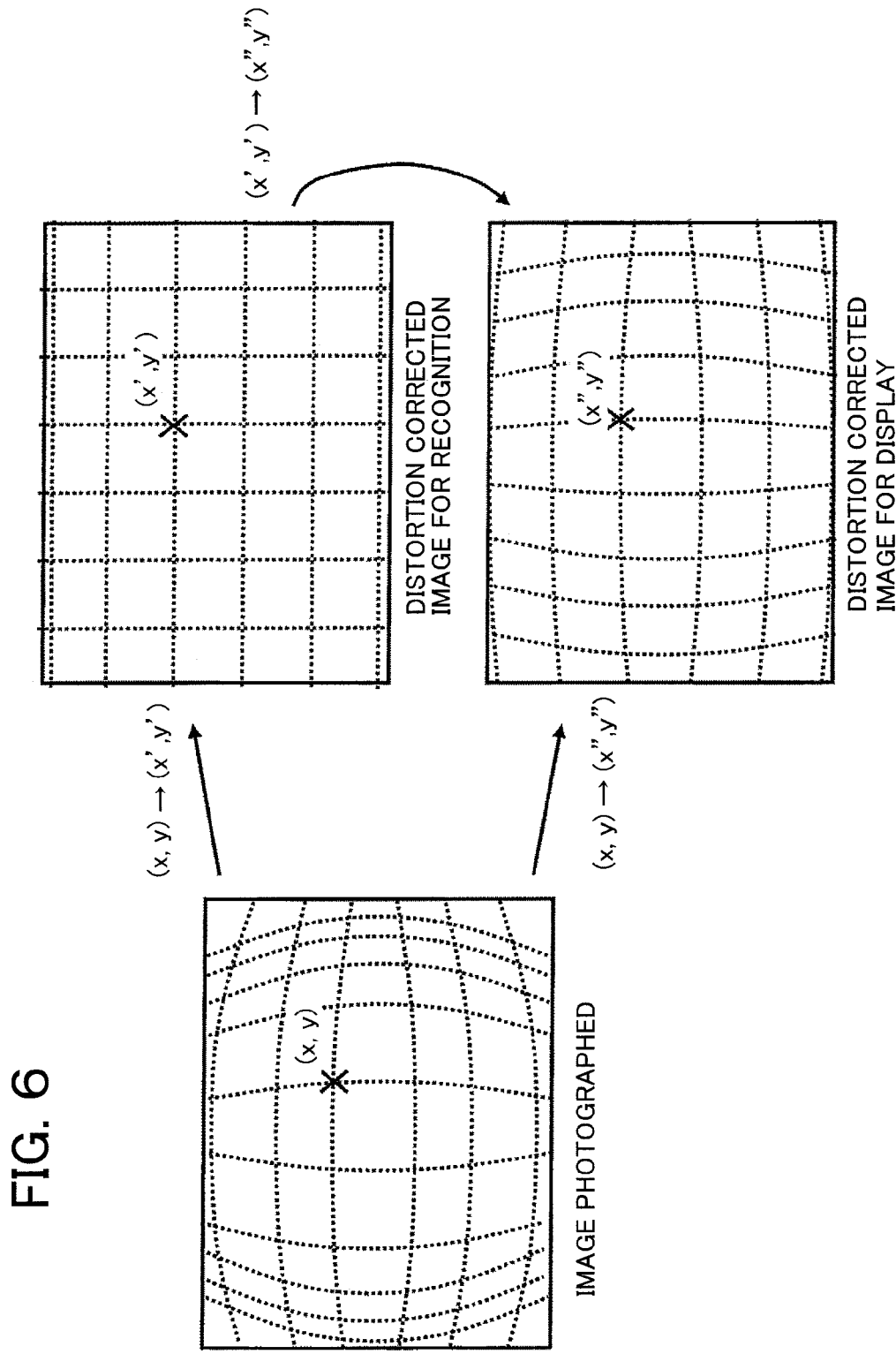
FIG. 6 is a view for showing an example of a process for calculating the display position of display information within the obstacle detection display device according to the third embodiment mentioned above.

Following to the above, FIG. 6 attached herewith is a view for explaining an example of the process for calculating the display position of the display information within the obstacle detection display device according to the embodiment 3, the structure of which is explained in the above, wherein this display position calculating process is executed within the display information producer portion 104.

First of all, in the left part of FIG. 6 is shown the image ("image photographed"), which is photographed by the image pickup portion 101, and in the right-upper part of the figure is shown the image ("distortion corrected image for recognition") after correcting the lens distortion of the image photographed by the image pickup portion 101 mentioned above, while in the right-lower part thereof is shown the image ("distortion corrected image for display") after correcting the lens distortion of the image, which is detected by the image pickup portion 101, by means of the recognition image corrector portion 503 mentioned above, respectively. Further, also in those three (3) images shown in this FIG. 6, the dotted lines are additional lines, which are drawn for presenting a degree of the lens distortion, and the mark "x" and the character line on the right-upper part thereof are additional information, which are described for clearly showing the representative coordinates in the image; however, those do not show the object in the actual image.

In this FIG. 6, the lens distortion correcting process, which should be executed by the recognition image corrector portion 503 mentioned above, from the "image photographed" (see the left in the figure) to the "distortion corrected image for recognition" (see the right-upper in the figure), can be carried out by copying the pixel data of the coordinates (x,y) within the image, which is photographed by the image pickup portion 101, onto the pixels of the corresponding coordinates (x',y') within the distortion corrected image for use of recognition. Also, the lens distortion correcting process, which should be executed by the display image corrector portion 502 mentioned above, from the "image photographed" (see the left in the figure) to the "distortion corrected image for display" (see the right-lower in the figure), can be carried, in the similar manner, by copying the pixel data of the coordinates (x,y) within the image, which is photographed by the image pickup portion 101, onto the pixels of the corresponding coordinates (x",y") within the distortion corrected image for use of display. However, those corresponding relationships may be stored, as was mentioned above, into the memories within the display image corrector portion 502 and the recognition image corrector portion 503, respectively, in the form of the look-up table, which describes the coefficient of a function equation for modeling the lens distortion or the corresponding relationship thereof, for example. Also, the high accuracy of the correction may be achieved, by obtaining the pixel data through the interpolation from the peripheral pixels of the accuracy of an integer when copying the pixel data, while keeping the coordinates (x,y) in the image photographed to be lower than the decimal point.

In this instance, it is possible to determine the pixels on which the object information should be superimposed, on the "distortion corrected image for display" (see the right-lower in the figure), by obtaining the coordinates (x',y') within the "distortion corrected image for recognition" (see the right-upper in the figure) corresponding to the coordinates (x",y") within that "distortion corrected image for display". Therefore, for the display information producer portion 104, after determining the positions of pixels for displaying the object information thereon, upon the image, the lens distortion of which is corrected within the recognition image corrector portion 503, it is enough to convert them into positions of the pixels for displaying the display information thereon, on the coordinates of the image, the lens distortion of which is corrected within the display image corrector portion 502, upon this corresponding relationship, and thereby outputting that position information to the display information superimpose portion 105 mentioned above, as the display position information. In this instance, comparing to the case of correcting only the lens distortion of the image as a whole thereof, since it is enough to execute that coordinates conversion process only upon the pixels, on which the object information should be displayed, it is possible to correct the position error or shift of the display position of the object information depending on the presence/absence of distortion, with a less amount of processing.

Herein, for the purpose of obtaining the coordinates (x",y") within the "distortion corrected image for use of display" (see the right-lower in the figure) corresponding to the coordinates (x',y') within the "distortion corrected image for recognition" (see the right-upper in the figure), if using the video conversion information, which is stored for correcting the lens distortion within the recognition image corrector portion 503, and the video conversion information, which is stored for correcting the lens distortion within the display image corrector portion 502, in combination thereof, it is possible to obtain a common use of the memories, as well as, reduction of the memory capacity thereof. And, it is also possible to store a look-up table, in advance, for correcting the display position of the object information from (x",y") to (x',y'), for example, as the video conversion information other than that mentioned above. With this, since it is enough to refer only one (1) set of coordinates, and therefore high-speeding of the process can be achieved.

In this manner, according to the present embodiment, within an object recognition device, executing the image recognition with using the image of the camera, so as to display the recognition result thereof under the condition of being superimposed on the image, it is possible to superimpose the information of a result of high accuracy image recognition, which can be obtained with using the image corrected on the lens distortion thereof at high accuracy, at high speed and without the position error and shift, for the image photographed by the wide-angle camera, being corrected on the lens distortion thereof in such a degree that it can be seen natural on an external appearance thereof.

However, the present invention should not be limited to the embodiments mentioned above, but it may include various modifications therein. For example, the embodiments mentioned above are explained in details thereof, for the purpose of easily understanding the present invention, and therefore the present invention should not be restricted, necessarily, only to that comprising all of the constituent elements explained in the above. Or alternately, a part(s) of the structure in any embodiment can be replaced with that of the structure in other embodiment, or the structure can be added to the structure of the other embodiment(s) can be added to the structure of a certain embodiment.

APPLICABILITY ON THE INDUSTRIES

The present invention can be applied, widely, such as, into the digital video camera for use of consumer appliances, for use of observation, for use of on-vehicle or for use of business use, etc., a still camera, or a stereo camera constructed with the above, etc., for example.

EXPLANATION OF MARKS

101 . . . image pickup portion, 102 . . . image corrector portion, 103 . . . image recognizer portion, 104 . . . display information producer portion, 105 ... display information superimpose portion, 201 ... first image pickup portion, 202 ... second image pickup portion, 203 ... stereo image recognizer portion, 502 ... display image corrector portion, and 503 ... recognition image corrector portion.

What is claimed is:

1. An obstacle detection display device, comprising:
   an image pickup means having a lens;
   at least one of circuitry and a processor configured to effect:
     an image correcting means for executing geometrical correction upon a video signal having distortion, which is outputted by the image pickup means, and outputting a geometrically corrected video signal;
     an image recognition means for detecting an obstacle and object information thereof, by executing video processing on the geometrically corrected video signal outputted by the image correcting means, and outputting the object information;
     a display information producing means for receiving the object information and determining display information, the display information including a frame for use of emphasizing display, to be superimposed on the video signal having the distortion, and the display information including a display position indicating a position for displaying the frame for use of emphasizing display in the video signal having the distortion, and outputting the display information; and
     a display information superimposing means for superimposing the frame for use of emphasizing display, which is outputted by the display information producing means, on the video signal having the distortion, at the position designated by the display position from the display information producing means, to produce a superimposed video signal, and outputting the superimposed video signal; wherein
   the display information producing means executes a correction calculation upon the display information including the frame for use of emphasizing display, by taking into consideration a position error of the obstacle, between the geometrically corrected video signal and the video signal having the distortion when determining the display position of the frame for use of the emphasizing display, to be superimposed on the video signal having the distortion.

2. The obstacle detection display device, as described in the claim 1, wherein the image pickup means having the lens is provided in plural numbers thereof.

3. The obstacle detection display device, as described in the claim 1, wherein the image correcting means comprises a display image correcting means for executing the geometrical correction upon the video signal having the distortion, and a recognition image correcting means for executing a geometrical correction with a degree higher than the geometrical correction executed by the display image correcting means on the video signal having the distortion.

4. The obstacle detection display device, as described in the claim 1, wherein first correction information, to be used when the image correcting means executes the geometrical correction upon the video signal having the distortion, is the same as second correction information to be used when the display information producing means executes the correction calculation upon the display information including the frame for use of emphasizing display.

5. The obstacle detection display device, as described in the claim 1, wherein first correction information to be used when the image correcting means executes the geometrical correction upon the video signal having the distortion through video processing, is different from second correction information to be used when the display information producing means executes the correction calculation upon the display information including the frame for use of emphasizing display.

6. The obstacle detection display device, as described in the claim 4, wherein
   the correction calculation is executed upon display positions of all pixels to be superimposed, based upon the second correction information, when the display information producing means executes the correction calculation upon the display information including the frame for use of emphasizing display.

7. The obstacle detection display device, as described in the claim 5, wherein
   the correction calculation is executed upon display positions of representative pixels among pixels to be superimposed, based upon the second correction information, while determining display positions for other pixels through an interpolation, when the display information producing means executes the correction calculation upon the display information including the frame for use of emphasizing display.

8. An obstacle detection display device, comprising:
   a first image pickup means having a lens;
   a second image pickup means having a lens;
   at least one of circuitry and a processor configured to effect:
     an image correcting means for executing geometrical correction upon a first video signal having distortion, which is outputted by the first image pickup means, and a second video signal having distortion, which is outputted by the second image pickup means, respectively, and outputting a combination of a first geometrically corrected video signal and a second geometrically corrected video signal, as a stereo video signal therefrom;
     a stereo image recognition means for detecting an obstacle and 3-dimensional object information thereof, by executing video processing upon the stereo video signal outputted by the image correcting means, and outputting the 3-dimensional object information;
     a display information producing means for receiving the 3-dimensional object information and determining display information, the display information including a frame for use of emphasizing display, to be superimposed on the first video signal having the distortion, or on the second video signal having the distortion, and the display information including a display position indicating a position for displaying the frame for use in emphasizing display in the first or second video signal having the distortion, based upon the 3-dimensional object information detected by the stereo image recognition means, and thereby outputting the display information; and
     a display information superimposing means for superimposing the frame for use in emphasizing display, which is outputted by the display information producing means, on the first video signal having the distortion, or on the second video signal having the distortion, based upon the display position outputted by the display information producing means, to produce a superimposed video signal, and outputting the superimposed video signal wherein
   the display information producing means executes a correction calculation upon the display information including the frame for use of emphasizing display, by considering a position error of the obstacle, between the stereo signal and the first or second video signal having the distortion, when determining the display position of the frame for use of the emphasizing display, to be superimposed on the first or second video signal having the distortion.

9. An obstacle detection display device, comprising:

an image pickup means having a lens;

at least one of circuitry and a processor configured to effect:

a display image correcting means for executing a first geometrical correction upon a video signal having distortion, which is outputted by the image pickup means, and outputting an image for use of display;

a recognition image correcting means for executing a second geometrical correction on the video signal having the distortion, with a degree higher than that executed by the display image correcting means, and outputting an image for use of recognition;

an image recognition means for detecting an obstacle and object information thereof, by executing image processing upon the image for use of recognition, which is outputted by the recognition image correcting means, and outputting the object information;

a display information producing means for receiving the object information and determining display information, the display information including a frame for use of emphasizing display, to be superimposed on the video signal having the distortion, and the display information including a display position indicating a position for displaying the frame for use of emphasizing display in the video signal having the distortion, and outputting the display information; and a display information superimposing means for superimposing the frame for use of emphasizing display, on the video signal having the distortion, at the position designated by the display position from the display information producing means, to produce a superimposed video signal, and outputting the superimposed video signal; wherein the display information producing means executes a correction calculation upon the display position of the display information, by taking into consideration a position error of the obstacle, between the image for use of display and the image for use of recognition when determining the display position of the frame for use of the emphasizing display, to be superimposed on the image for use of display outputted by the display image correcting means.

\* \* \* \* \*